US008763366B2

(12) United States Patent
Christner et al.

(10) Patent No.: US 8,763,366 B2
(45) Date of Patent: Jul. 1, 2014

(54) METHOD FOR OPERATING AN INTERNAL COMBUSTION ENGINE (71) Applicant: Daimler AG, Stuttgart (DE)

(72) Inventors: Bernd Christner, Huelben (DE);
Alexander Kaiser, Fellbach (DE);
Berthold Keppeler, Owen (DE); Holger Kissling, Boll (DE); Markus Paule, Korb (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/826,573

(22) Filed: Mar. 14, 2013

(65) Prior Publication Data

US 2013/0219864 A1    Aug. 29, 2013

Related U.S. Application Data (63) Continuation of application No. 13/307,454, filed on Nov. 30, 2011, now Pat. No. 8,429,897, which is a continuation of application No. 12/067,747, filed as application No. PCT/EP2006/008509 on Aug. 31, 2006, now Pat. No. 8,091,339.

(30) Foreign Application Priority Data

Sep. 22, 2005    (DE) .................. 10 2005 045 294

(51) Int. Cl.
*F01N 3/00* (2006.01)
*F01N 3/10* (2006.01)
*F01N 3/02* (2006.01)

(52) U.S. Cl.
USPC .................. 60/284; 60/274; 60/285; 60/286; 60/300; 60/301; 60/311

(58) Field of Classification Search
USPC ........... 60/274, 284, 285, 286, 295, 300, 301, 60/303, 311
See application file for complete search history.

(56) References Cited

U.S. PATENT DOCUMENTS 4,157,701 A    6/1979  Holtrop et al.
4,518,268 A    5/1985  Swis et al.
(Continued)

FOREIGN PATENT DOCUMENTS

DE    101 55 339 A1    5/2003
DE    102 48 720 A1    6/2003
(Continued)

OTHER PUBLICATIONS

International Search Report dated Dec. 12, 2006, and PCT/ISA/237 with English translations of relevant portions (Sixteen (16) Pages).

*Primary Examiner* — Audrey K Bradley
(74) *Attorney, Agent, or Firm* — Crowell & Moring LLP (57) ABSTRACT In a method for operating an air-compressing fuel-injection internal combustion engine having an exhaust gas post-treatment system with a particle filter and a nitrogen oxide reduction catalytic converter, a plurality of internal combustion engine operating settings are provided, each having respective predefined values for predefined internal combustion engine operating parameters. A heating operating setting is set when the internal combustion engine is warming up, while a basic operating setting is set in the warmed-up state. When the temperature in the exhaust gas system exceeds a predefinable first value, the heating operating setting is changed over to the basic operating setting. In the warmed-up state, at least one further (third) operating setting, with an exhaust gas recirculation rate that is reduced compared to the basic operating setting, is provided in addition to the basic operating setting.

23 Claims, 3 Drawing Sheets

(56) References Cited

U.S. PATENT DOCUMENTS

| | | | |
|---|---|---|---|
| 4,995,358 A | 2/1991 | Gayler et al. | |
| 6,758,037 B2 | 7/2004 | Terada et al. | |
| 6,789,512 B2 | 9/2004 | Duvinage et al. | |
| 2002/0050265 A1 | 5/2002 | Yoshida et al. | |
| 2002/0152746 A1 | 10/2002 | Mikami et al. | |
| 2003/0079716 A1 | 5/2003 | Mura | |
| 2004/0115111 A1* | 6/2004 | Twigg | 423/239.1 |
| 2005/0039439 A1 | 2/2005 | Kitahara | |
| 2006/0021346 A1* | 2/2006 | Whelan et al. | 60/605.2 |
| 2006/0196169 A1 | 9/2006 | Ripper et al. | |

FOREIGN PATENT DOCUMENTS

| | | |
|---|---|---|
| DE | 102 43 270 A1 | 3/2004 |
| DE | 103 23 245 A1 | 12/2004 |
| EP | 1 321 641 A1 | 6/2003 |
| EP | 1 398 483 A2 | 3/2004 |
| JP | 6-299893 A | 10/1994 |
| JP | 2000-110642 A | 4/2000 |
| JP | 2000/303892 A | 10/2000 |
| JP | 2003-65121 A | 3/2003 |
| JP | 2003-269230 A | 9/2003 |
| JP | 2005-48752 A | 2/2005 |
| JP | 2005-147002 A | 6/2005 |

* cited by examiner

METHOD FOR OPERATING AN INTERNAL COMBUSTION ENGINE

CROSS-REFERENCE TO RELATED APPLICATIONS

This application is continuation of application Ser. No. 13/307,454, filed Nov. 30, 2011, which is a continuation of application Ser. No. 12/067,747, filed Aug. 29, 2008, which is a national stage of PCT International Application No. PCT/EP2006/008509, filed Aug. 31, 2006, which claims priority under 35 U.S.C. §119 to German Patent Application No. 10 2005 045 294.9, filed Sep. 22, 2005, the entire disclosures of which are herein expressly incorporated by reference.

BACKGROUND AND SUMMARY OF THE INVENTION

The invention relates to a method for operating an air-compressing fuel-injection internal combustion engine having an exhaust gas post-treatment system with a particle filter and a nitrogen oxide reduction catalytic converter, in which a plurality of internal combustion engine operating settings are possible, with respective predefined values for predefined internal combustion engine operating parameters.

German patent document DE 101 55 339 A1 discloses a method for operating an internal combustion engine in which the coolant is heated rapidly by a heating operating setting, so that sufficient heat is quickly available for heating the passenger compartment. The method comprises setting internal combustion engine operating parameters which for the most part degrade the thermodynamic efficiency and cause a comparatively high release of heat. However, aspects relating to the emission of pollutants and to the consumption of fuel are not taken into account.

German patent document DE 103 23 245 A1 also proposes an operating setting with poor thermodynamic efficiency in order to increase the exhaust gas temperature of an internal combustion engine. The associated proposed measures are aimed in particular at heating an oxidation catalytic converter arranged in the exhaust gas system in the internal combustion engine, so that said oxidation catalytic converter can better convert pollutants. In this context, aspects which relate to the consumption of fuel are also largely left unconsidered.

One object of the present invention is to provide a method for operating an air-compressing fuel-injection internal combustion engine which, on the one hand, permits low emission of pollutants, while at the same time permitting low fuel consumption.

This and other objects and advantages are achieved by the method according to the invention for operating an air-compressing fuel-injection internal combustion engine, which is aimed, in terms of the emission of pollutants, in particular at low emission of particles and low emission of nitrogen oxide. For this purpose, an exhaust gas post-treatment system having a particle filter and a nitrogen oxide reduction catalytic converter is provided for the internal combustion engine. In order to achieve, on the one hand, optimum operation of the exhaust gas post-treatment system and, on the other hand, low consumption of fuel, a plurality of internal combustion engine operating settings with respective predefined values for pre-defined internal combustion engine operating parameters are provided. When the internal combustion engine warms up, a heating operating setting is set, and in the warmed-up state, (i.e., after warming up has taken place), a basic operating setting is set. The heating operating setting ensures that catalytic exhaust gas cleaning components, (in particular the nitrogen oxide reduction catalytic converter) in the exhaust gas post-treatment system quickly reach their operating temperature.

In this context, the basic operating setting is made more favorable in terms of consumption compared to the heating operating setting. If a predefinable first temperature threshold value in the exhaust gas post-treatment system is exceeded, the system changes from the heating operating setting to the basic operating setting. The upward crossing of the first temperature threshold value preferably characterizes a ready-to-operate state of an exhaust gas catalytic converter (in particular, of the nitrogen oxide reduction catalytic converter). This procedure shortens the warming up phase which is critical in terms of the emission of pollutants, therefore keeping the total pollutants generated in the warming up phase low. On the other hand, it is ensured that the heating operating setting, which is unfavorable in terms of consumption, is maintained for no longer than necessary. As a result, the additional consumption caused by the heating operating setting is minimized.

According to the invention, in the warmed-up state, at least one further, in particular a third, operating setting with an exhaust gas recirculation rate which is reduced compared to the basic operating setting is provided in addition to the basic operating setting.

An operating setting of the internal combustion engine within the meaning of the invention is characterized by a set of internal combustion engine operating parameters which determine the profile of the combustion of fuel in a combustion chamber or chambers of the internal combustion engine. Such internal combustion engine operating parameters can be set largely and/or mainly independent of the load rotational speed state of the internal combustion engine.

The internal combustion engine operating parameters which are decisive in terms of the combustion profile relate to the supply of both air and gas, as well as the supply of fuel to the combustion chambers. In particular, the internal combustion engine operating parameters which are decisive for an operating setting comprise the degree of exhaust gas recirculation, the degree of cooling of the recirculated exhaust gas and/or of the charge air of a supercharging unit and its charge air pressure, and the control of air movements in the combustion chamber, particularly in terms of turbulence in the form of swirl. In addition, the number, start and duration of fuel injection processes as well as the fuel injection pressure which is set in the context are also included, as are control times and/or the stroke of valves which determine the gas exchange and the compression ratio. The components and actuators which are necessary for this purpose are, insofar as they are necessary, to be considered as parts of the internal combustion engine here.

As far as the exhaust gas post-treatment system is concerned, in principle any component which is suitable for removing constituents of exhaust gas in the form of particles can be used as the particle filter. For example, what are referred to as wall flow filters, sintered metal filters, depth filters or open filter systems can be used, and a catalytic coating is advantageous in this context. The nitrogen oxide reduction catalytic converter can be, in particular, what is referred to as an SCR catalytic converter based on vanadium pentoxide and/or a noble metal. However, it is also possible to use a nitrogen oxide storage catalytic converter and/or non-selective, or less selective, denox catalytic converters. The exhaust gas post-treatment system preferably comprises further catalytic cleaning units. An oxidation catalytic converter, preferably in a position close to the engine, is particularly preferred.

Warming up within the sense of the present method is understood to mean the operating phase after the internal combustion engine starts until a component temperature and/or operating resource temperature which characterizes warming up is reached. This is preferably a temperature threshold value in the exhaust gas post-treatment system.

In the third operating setting according to the invention, the relatively high exhaust gas recirculation rates of approximately 50% to 60% (which are preferably provided for the basic operating setting) are reduced by approximately 10% to 40%, so that in the third operating setting exhaust gas recirculation rates of approximately 10% to 45% are preferred.

The third operating setting can be configured here for further improving the consumption of fuel. For this purpose, in addition to the reduction in the exhaust gas recirculation rate to approximately 25%, preferably one or more further internal combustion engine operating parameters (such as, for example, the start of a fuel main injection and/or the fuel injection pressure) are correspondingly adapted. A start of the fuel main injection which is earlier compared to the basic operating setting is typically set. In particular, in a third operating setting which is configured to be optimum in terms of consumption it is advantageous if the injection pressure is raised by approximately 50 bar to 500 bar compared to the basic operating setting which is less favorable in terms of consumption. Possible worsening of the raw emissions from the engine which are associated with this change does not affect the total emissions (exhaust end pipe emissions) because the exhaust gas post-treatment system is then fully functionally capable.

However, the third operating setting can also be configured to heat the exhaust gases. With this configuration, in addition to reducing the exhaust gas recirculation rate (in this case, by approximately 10%), one or more further internal combustion engine operating parameters are preferably also adapted compared to the basic operating setting. In this refinement, cooling of exhaust gas cleaning components which has occurred or threatens to occur due, for example, to unfavorable travel states, can be avoided or eliminated by the third operating setting, so that their functional capability is not adversely affected. An exhaust gas recirculation rate of approximately 45% to 55%, and therefore an only slightly smaller exhaust gas recirculation rate than in the basic operating setting, is preferably set. In addition, it is advantageous for application of heat to the exhaust gas to add a late fuel post-injection with a start of injection at approximately 60°CAaTDC to 160°CAaTDC (degrees of crank angle after the top dead center), whereas preferably no post-injection is provided for the basic operating setting.

In one refinement of the invention, the internal combustion engine is operated with a compression ratio of less than 19:1, at least in one of the combustion methods which are set in the warmed-up state. The internal combustion engine is preferably operated with a compression ratio of less than 18:1 and particularly preferably of less than 17:1. The compression ratio may be variable in this context, but it is preferably permanently predefined owing to the geometries and is of the same size for all cylinders of the internal combustion engine. Due to the comparatively low compression ratio for an air-compressing internal combustion engine, it can be operated with particularly low raw emissions of nitrogen oxide. The nitrogen oxide reduction catalytic converter can therefore operate particularly effectively, so that correspondingly low nitrogen oxide emission values are made possible for the exhaust end pipe emissions. If appropriate, the nitrogen oxide reduction catalytic converter can also be made smaller and therefore more cost effective than in internal combustion engines which are operated with a relatively high compression ratio. A relatively small nitrogen oxide reduction catalytic converter also exhibits improved warming up behavior and is easily accommodated in the exhaust gas system. The nitrogen oxide reduction catalytic converter then preferably has a catalytic converter volume which is less than three times, particularly preferably less than twice, the cubic capacity of the internal combustion engine.

In a further refinement of the invention, the first temperature threshold value characterizes a start of the effectiveness of the nitrogen oxide reduction catalytic converter, and an additive for nitrogen oxide reduction is added to the internal combustion engine exhaust gas in the warmed-up state upstream of the nitrogen oxide reduction catalytic converter. A temperature is preferably sensed in the bed of the catalytic converter or at the inlet end of the nitrogen oxide reduction catalytic converter and compared with a respective, stored reference value which correlates with or corresponds to what is referred to as the light-off temperature of the nitrogen oxide reduction catalytic converter. In this context the stored reference value can be adapted continuously or from time to time in accordance with an aging state of the nitrogen oxide reduction catalytic converter. If the reference value is exceeded, the combustion method is changed over, an enable signal for the supply of the additive is set and, if appropriate, the supply is started immediately. The nitrogen oxide reduction catalytic converter is preferably embodied as an SCR catalytic converter and the additive is ammonia, urea or some other substance which is capable of releasing ammonia.

In a further refinement of the invention, when the heating operating setting is active and a predefinable second temperature threshold value is exceeded in the exhaust gas post-treatment system, a separate fuel post-injection is activated. The other internal combustion engine operating parameters of the heating operating setting preferably remain unchanged. This is therefore a variant of a heating operating setting with an additional fuel post-injection. The activated fuel post-injection is preferably configured as a late, fuel post-injection which does not also burn and has a start of injection of approximately 140°CAaTDC. Therefore with this refinement of the method, the internal combustion engine first operates without late post-injection immediately after it starts with the heating operating setting active. The late post-injection is activated only when the second temperature threshold value is exceeded.

It is advantageous here if, immediately after the internal combustion engine starts, an early, accumulated post-injection which also burns is carried out and is also maintained after the late post-injection is activated. When the late post-injection is activated, a certain degree of warming up has already taken place so that condensable components which have possibly entered the exhaust gas through the post-injection are prevented from becoming deposited and raised hydrocarbon exhaust end pipe emissions are avoided.

In a further refinement of the invention, the second temperature threshold value characterizes the start of the effectiveness of an oxidation catalytic converter connected upstream of the particle filter. The temperature in the bed of the catalytic converter and/or at the inlet end of the oxidation catalytic converter is preferably sensed and compared with a stored respective reference value which correlates with the light-off temperature of the oxidation catalytic converter or corresponds to it. The unburnt components in the oxidation catalytic converter which are introduced into the exhaust gas when a late post-injection is activated and the heating operating setting is active, can therefore be converted. As a result, the application of heat into the exhaust gas rises so that even exhaust gas cleaning units which are arranged further away from the engine are quickly heated up.

In order to ensure that unburnt exhaust gas components in the oxidation catalytic converter are converted over the running time, that the stored reference value can be adapted, continuously or from time to time, in accordance with the aging state of the oxidation catalytic converter. If the reference value is exceeded, the late fuel post-injection is activated.

In a further refinement of the method, when either the heating operating setting or the basic operating setting is active, the fuel injection comprises at least one separate pre-injection. A separate pre-injection which is positioned in terms of timing before the main injection ensures stable combustion. This is advantageous both with respect to the late post-injection which is carried out in the heating operating setting and with respect to a low compression ratio.

Further stabilization of the combustion is achieved if, in a further refinement of the method, at least when the basic operating setting is active, double fuel pre-injection is performed.

In a further refinement of the method, when the heating operating setting is active, a fuel injection pressure which is reduced compared to the basic operating setting is set. This measure permits a further increased application of heat into the exhaust gas, thereby further increasing heating up speed of the exhaust gas post-treatment system, with simultaneously reduced NOx raw emissions.

In a further refinement of the method, when a third operating setting is active, an increased fuel injection pressure (compared to the basic operating setting) is set, so that an improved combustion in the combustion chambers can be achieved. The increase compared to the basic operating setting is typically between 50 bar and 500 bar. The rated injection pressure which is provided for the fuel injection system is therefore typically achieved under full load and at increased rotational speeds.

In a further refinement of the method, in the warmed-up state, a further, fourth operating setting is also performed, in which, when there is a changeover from the basic operating setting or from the third operating setting into the fourth operating setting, a late fuel post-injection is activated and/or the exhaust gas recirculation rate is reduced. The third operating setting is configured here to be optimized in terms of consumption, while the fourth operating setting facilitates heating the exhaust gas. Apart from the activated fuel post-injection or the reduced exhaust gas recirculation rate, the other internal combustion engine operating parameters of the basic operating setting preferably remain unchanged.

In a further refinement of the method, at least in one of the operating settings which is provided in the warmed-up state, an at least temporary inlet duct deactivation is provided. This measure is preferably carried out in a low load range (with less than approximately 50% of the rated load). However, at comparatively low rotational speeds the inlet duct deactivation can also be provided in the entire load range. The deactivated inlet duct is preferably what is referred to as a filling duct, while the non-deactivated inlet duct is preferably what is referred to as a swirl duct. Deactivating the filling duct achieves an increased swirl of the supply of gas and therefore better combustion, lower emission of particles and lower consumption of fuel. The deactivation of an inlet duct is preferably performed continuously as the load decreases.

In a further refinement of the method, at least in one of the operating settings which is provided in the warmed-up state, a glow plug which is assigned to a combustion chamber of the internal combustion engine is heated, at least temporarily.

This measure is preferably also performed in a partial load range of the internal combustion engine and/or when the external temperature is low. As a result, the injected fuel is reliably ignited and therefore low HC raw emissions and low consumption of fuel are achieved. This is advantageous in particular in conjunction with a low compression ratio.

Other objects, advantages and novel features of the present invention will become apparent from the following detailed description of the invention when considered in conjunction with the accompanying drawings.

DETAILED DESCRIPTION OF THE DRAWINGS

Figure 1:
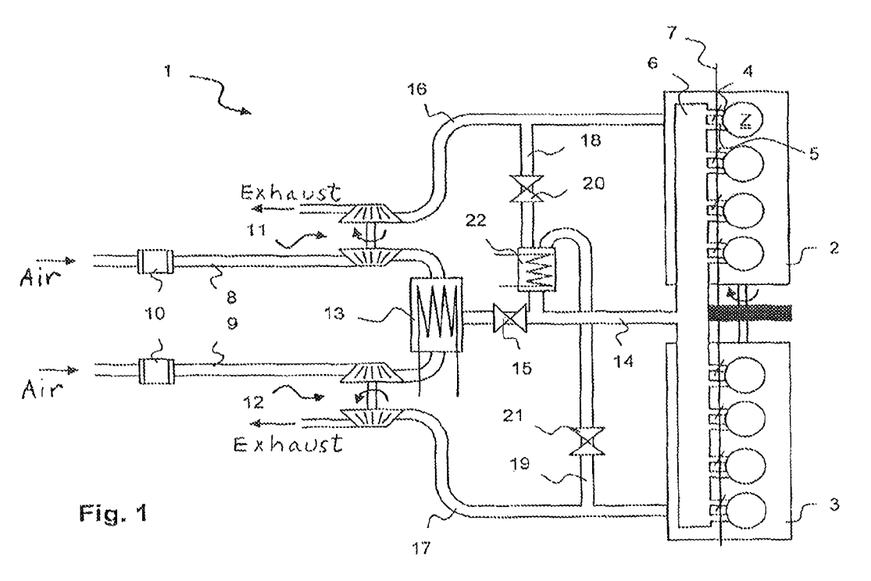
FIG. 1 is a schematic illustration of an advantageous embodiment of an internal combustion engine for carrying out the method according to the invention.

FIG. 1 shows schematically an internal combustion engine 1 for a motor vehicle (not shown), which is provided for carrying out the method according to the invention, with particular consideration of the supply of gas. The internal combustion engine 1 is preferably embodied as a direct-injection, air-compressing internal combustion engine with a low compression rate. An assigned injection system (not shown) is preferably embodied as a common rail system with an adjustable rail pressure or fuel injection pressure.

The internal combustion engine 1 has a plurality of cylinders Z which are distributed here between two cylinder banks 2, 3; each cylinder has a combustion chamber with two inlet valves, two outlet valves, a glow plug and a fuel injector, (not illustrated in more detail individually). A first inlet duct 4 and a second inlet duct 5 are assigned to each cylinder Z and combustion air can be fed to the respective cylinder Z via said inlet ducts 4 and 5. In this context the corresponding components have been provided with the associated reference symbols only for the first cylinder Z, for the sake of clarity.

The inlet ducts 4, 5 are connected to an air supply duct 6 which is common to the cylinder Z of the internal combustion engine 1. The opening cross section of a respective first inlet duct 4 of an inlet duct deactivation device 7 which is common to all the cylinders Z, can be changed continuously between an open position and a closed position. For this purpose, an adjustable flap is preferably provided. The respective first inlet duct 4 is preferably embodied as a filling duct, and the second inlet duct 5 is preferably embodied as a swirl duct.

The internal combustion engine 1 receives its combustion air via first and second air supply lines 8, 9, in each of which an air mass flow rate meter 10 is arranged. The combustion air of the air supply lines 8, 9 is compressed by means of respective exhaust gas turbochargers 11, 12 and fed to a charge air cooler 13 for cooling the compressed combustion air. At the outlet end, the charge air cooler 13 is connected via a third air supply line 14 to the air supply duct 6, with a throttle valve 15 being arranged in the third air supply line 14.

Exhaust gas generated in the combustion chambers of the cylinders Z is discharged via exhaust gas lines 16, 17 which are assigned to the cylinder banks 2, 3. In addition, exhaust gas can also be added to the combustion air via exhaust gas recirculation lines 18, 19 and therefore fed back to the internal combustion engine 1. The proportion of fed back exhaust gas (EGR rate) can be set by means of EGR valves 20, 21 in the exhaust gas recirculation lines 18, 19 and by means of the throttle valve 15. The exhaust gas which is fed back to the internal combustion engine 1 is preferably temperature controlled by means of an EGR cooler 22, but the EGR cooler 22 can also be bypassed (not shown). Optionally cooled or hot exhaust gas can therefore be added to the combustion air. Exhaust gas which has not been recirculated is fed to an exhaust gas post-treatment system via the exhaust gas turbochargers 11, 12.

Figure 2:
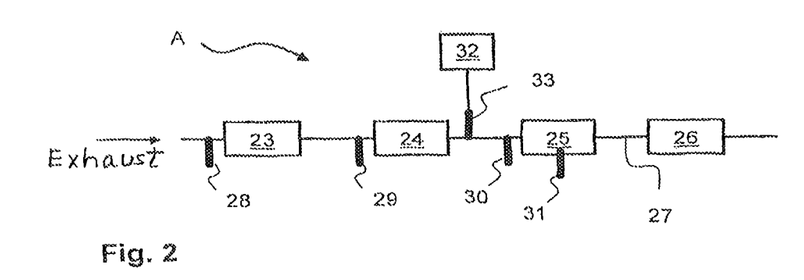
FIG. 2 is a preferred embodiment of an exhaust gas post-treatment system for carrying out the method according to the invention.

A preferred embodiment of the exhaust gas post-treatment system A for an internal combustion engine 1, illustrated schematically in block form in FIG. 2, comprises (in the direction of flow of the exhaust gas) an oxidation catalytic converter 23, a particle filter 24, an SCR catalytic converter 25 and a downstream sound damper 26. The latter components are arranged in an exhaust gas line 27, in which the oxidation catalytic converter 23 is preferably installed close to the internal combustion engine while the SCR catalytic converter 25 is arranged in an underfloor position with respect to the associated motor vehicle. In order to meter ammonia or a reducing agent which is able to release ammonia, a reducing agent metering system 32 is provided. The reducing agent can be fed to a metering nozzle 33 from which it is added to the exhaust gas in a finely distributed way upstream of the SCR catalytic converter 25.

The exhaust gas line 27 can adjoin one of the respective exhaust gas turbochargers 11, 12 at the internal combustion engine end. In this case, the exhaust gas post-treatment system A is provided twice. However it is also possible to provide for the exhaust gas lines 16, 17 to be combined downstream of the exhaust gas turbochargers 11, 12 and for the exhaust gas streams therefore to be fed together to the exhaust gas line 27. In this case only a single embodiment of the exhaust gas post-treatment system A is provided.

Temperature sensors 28, 29, 30, 31, provided in the exhaust gas post-treatment system A, can be used to sense the temperatures upstream of the oxidation catalytic converter 23, the particle filter 24 and the SCR catalytic converter 30 and in the bed of the SCR catalytic converter. In addition, further sensors which are not illustrated in FIGS. 1 and 2, in particular for pressures and temperatures in the lines and components assigned to the exhaust gas post-treatment system A and the internal combustion engine 1, may be provided.

To operate the internal combustion engine 1 in an optimum way, an electronic control unit is provided which, on the one hand, receives information about decisive state variables such as, for example, temperatures and pressures from the corresponding sensors and, on the other hand, can output control signals as setting variables to actuators such as, for example, the EGR valves 20, 21 or the inlet duct deactivation means 7. In particular, the control unit is able to actuate the fuel injectors in order to carry out multiple injections and to set the fuel injection pressure according to requirements.

In order to determine the setting variables, the control unit can make use of stored characteristic diagrams or calculation routines. In this context, the control unit and the associated inputs and outputs are not illustrated. The control unit is therefore able to set the decisive operating parameters on the gas supply side as well as those for the fuel supply as a function of the sensed state variables, and therefore influence the combustion process in the combustion chambers of the internal combustion engine 1 in a way which is targeted and compatible with requirements.

According to the invention, various operating settings are provided for operating the internal combustion engine 1 economically and with a low level of pollutants. In this case a set of predefined internal combustion engine operating parameters (which are associated with a specific operating setting and which have respectively predefined values) corresponds to a specific combustion method which is assigned to the respective operating setting. If the predefined values for the predefined internal combustion engine operating parameters (associated with a respective operating setting) are set, the corresponding combustion method becomes active. A changeover from one combustion method to another (i.e., from one operating setting into another) is performed when predefinable switchover criteria are present. These switchover criteria relate essentially to the upward or downward transgression of predefinable temperature threshold values of component temperatures or operating resource temperatures. A particularly preferred procedure will be explained below with reference to a state diagram which is illustrated in FIG. 3.

Figure 3:
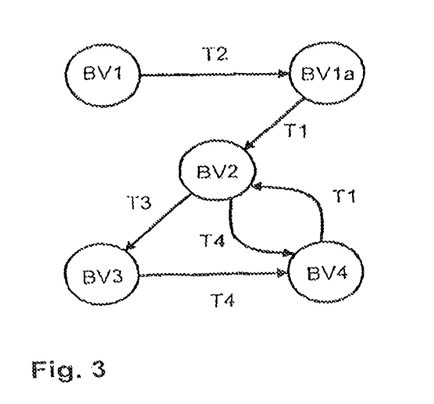
FIG. 3 is a schematic state diagram of a preferred sequence of the method according to the invention.

In FIG. 3, BV1, BV1$a$, BV2, BV3, BV4 denote various operating settings or combustion methods, and the changeovers from one combustion method to another take place according to the indicated arrows. In this context, the switchover criteria which are decisive for a changeover are denoted by T1, T2, T3, T4 and are preferably determined by corresponding temperature threshold values. The internal combustion engine 1 is correspondingly operated as follows.

When there is a cold start of the internal combustion engine 1, a first heating operating setting or a first heating combustion method BV1 (configured for rapid heating of the exhaust gas post-treatment system A) is first set. Here, a cold start is understood to mean the presence of a cooled exhaust gas post-treatment system A and/or a cooled coolant when the internal combustion engine 1 starts. Temperatures below approximately 180° C. are typically present here in the exhaust gas post-treatment system A, in particular upstream of the particle filter 24, and the coolant is typically at temperatures below approximately 50° C.

When the first heating combustion method BV1 is active, these temperatures rise quickly and when a first switchover criterion T2 is present with BV1$a$ a second heating operating setting (second heating combustion method) is set as a variant of the first heating combustion method BV1. When a second switchover criterion T1 is present, a warmed-up state is reached and a changeover to a basic operating setting (basic combustion method) BV2 is carried out. The basic operating setting is configured to be significantly more economical in terms of fuel compared to the heating combustion method BV1, BV1$a$, but permits further slight heating of the exhaust gas post-treatment system A.

The presence of a third switchover criterion T3 characterizes a fully operationally capable state of the exhaust gas post-treatment system A and brings about a changeover into a third combustion method BV3 with third operating settings, in which case BV3 is configured for optimization of consumption.

If, due to unfavorable travel conditions, cooling in the exhaust gas post-treatment system A occurs starting from the basic combustion method BV2 or the third combustion method BV3, in such a way that predefinable cleaning characteristic values (such as, for example, conversion of pollutants) are undershot, a fourth switchover criterion T4 is present. In this case, a changeover to a fourth combustion method BV4 with fourth operating settings takes place, in which case BV4 has an increased heating effect for the exhaust gas post-treatment system A compared to the basic combustion method BV2. If sufficient heating occurs due to the setting of the fourth combustion method BV4, there is a changeover back to the basic operating method BV2 when the second switchover criterion T1 is present.

Preferred refinements of the individual switchover criteria are explained below.

The first switchover criterion T2 which is decisive for the changeover from the first heating combustion method BV1 to the second heating combustion method BV1a is preferably present if the oxidation catalytic converter 23 has a minimum conversion capacity in terms of oxidation of unburnt exhaust gas components. (That is, it has exceeded its light-off temperature.) This is typically the case if at the inlet end of the particle filter 24 or at the inlet end of the oxidation catalytic converter 23 a temperature threshold value of approximately 180° C. is exceeded, which is detected by means of the temperature sensor 29 and the temperature sensor 28, respectively.

The second switchover criterion T1 which is decisive for the changeover from the second heating combustion method BV1a to the basic combustion method BV2 is preferably present if the SCR catalytic converter 25 has a minimum conversion capacity in terms of nitrogen oxide conversion. (That is, it has exceeded its light-off temperature.) This is typically the case if at the inlet end of the SCR catalytic converter 25 or in the bed of the SCR catalytic converter a temperature threshold value of approximately 220° C. is exceeded, which is detected by means of the temperature sensor 30 and the temperature sensor 31, respectively. In this case, the addition of a reducing agent into the exhaust gas post-treatment system A is enabled. If appropriate, the reducing agent metering system 32 is correspondingly actuated for immediate metering of the reducing agent.

The third switchover criterion T3 which is decisive for the changeover from the basic combustion method BV2 to the combustion method BV3 is preferably present if the SCR catalytic converter 25 has at least approximately reached its maximum conversion capacity. This is typically the case if at the inlet end of the SCR catalytic converter 25 or in the bed of the SCR catalytic converter a temperature threshold value of approximately 250° C. is exceeded, which is detected by means of the temperature sensor 30 or temperature sensor 31.

The fourth switchover criterion T4 which is decisive for the changeover from the basic combustion method BV2 or the third combustion method BV3 to the fourth combustion method BV4 is preferably present if the SCR catalytic converter 25 has undershot a predefinable minimum conversion capacity. This is typically the case if at the inlet end of the SCR catalytic converter 25 or in the bed of the SCR catalytic converter a temperature threshold value of approximately 210° C. is undershot, which is detected by means of the temperature sensor 30 and the temperature sensor 31, respectively. This temperature threshold value is thus slightly below the temperature threshold value which serves as switchover criterion T1. As a result, a certain hysteresis is provided and excessively frequent switching over, in particular between the basic combustion method BV2 and the fourth combustion method BV4, is avoided.

As mentioned, the fourth combustion method BV4 is configured for heating of the exhaust gas post-treatment system A. If this has taken place sufficiently, the basic combustion method BV2 is therefore set again, as illustrated in FIG. 3. The presence of the switchover criterion T1, which has already been explained at the state changeover from the second heating combustion method BV1a to the basic combustion method BV2, is preferably decisive for this.

Preferred refinements of the operating settings (i.e., preferred refinements of the individual combustion methods) are explained below, the basic combustion method BV2 serving as a starting point. In the explanation of the other combustion methods, reference is made to the internal combustion engine operating parameters which are set in the basic combustion method BV2, and the most important differences are explained.

The basic combustion method BV2 is preferably configured for low nitrogen oxide (NOx) raw emissions, which permits especially low NOx exhaust end pipe emission values, even when the SCR catalytic converter 25 is not optimally effective. It is advantageous for this purpose to set a comparatively late position of the center of combustion. In particular, the following fuel injection parameters are preferred. A main injection and at least one pre-injection which is offset in terms of timing from the main injection are provided. Post-injection is dispensed with. A comparatively late start of the main injection is preferably set. In the case of a medium internal combustion engine load and internal combustion engine rotational speed, typical values are approximately 2°CAaTDC to approximately 6°CAaTDC. A start of main injection at approximately 4°CAaTDC is particularly preferred here. A start of injection between 3°CA and 7°CA before the start of the main injection is preferably set for the at least one pre-injection.

It is particularly preferred, in the basic combustion method BV2, to set two individual pre-injections which are offset from one another and from the main injection. In order to achieve the lowest possible NOx raw emissions, the combustion air which is fed to the internal combustion engine 1 can be enriched comparatively heavily with exhaust gas (i.e., to set comparatively high exhaust gas recirculation rates (EGR rates)), at least for low load and for a medium load. An EGR rate which decreases as the load increases, starting from approximately 65% at low load to zero % at full load, is provided, and the recirculated exhaust gases are conducted via the EGR cooler (i.e., a cooled exhaust gas recirculation). With the operating parameters which are set it is possible to achieve optimum combustion in terms of the formation of NOx, but this is not optimized thermodynamically so that when a basic combustion method BV2 is set a certain degree of heating of the exhaust gas post-treatment system A takes place.

In contrast, the third combustion method BV3 is optimized in terms of the consumption of fuel. In comparison with the basic combustion method BV2, a relatively early start of the main injection is set. A start of the main injection in the region of the top dead center or at approximately 2°CAbTDC is preferred for an average internal combustion engine load and internal combustion engine rotational speed. At the same time, a reduced EGR rate is set, preferably approximately 25% in the third combustion method BV3. In addition, for combustion which is improved in terms of thermodynamics the fuel injection pressure is increased by 50 bar to 500 bar compared to the basic combustion method BV2, given comparable load points. In this case, as for the other combustion methods, a fuel injection pressure which increases as the internal combustion engine load increases is preferably set. The further settings remain preferably unchanged compared to the basic combustion method BV2. At least one separate pre-injection is therefore also preferably provided for the third combustion method BV3.

In contrast to the third combustion method BV3, the fourth combustion method BV4 is aimed at increased heating of the exhaust gas post-treatment system A. This is achieved by activating a late post-injection, which preferably does not also burn. Preferably, the start of post-injection is in the range from 60°CAaTDC up to 160°CAaTDC, with 110°CAaTDC to 150°CAaTDC being particularly preferable. The post-injected fuel is no longer detected by the combustion in the combustion chamber here and passes essentially without being chemically changed, but in a vaporized form, into the exhaust gas. In the exhaust gas post-treatment system, post-combustion can take place, for example at the oxidation catalytic converter 23, as a result of which heating is brought about. An EGR rate of typically 40% to 50%, which is slightly reduced compared to the basic combustion method BV2, is set as an additional measure. The further settings preferably remain unchanged compared to the basic combustion method BV2. At least one separate pre-injection is therefore preferably also provided for the fourth combustion method BV4.

A heating effect which is increased compared to the fourth combustion method BV4 is brought about by the first heating combustion method BV1. As far as the fuel injection parameters are concerned, an individual, offset pre-injection with a start of injection of approximately 5°CA before the start of the main injection and a start of main injection which is later compared to the basic combustion method BV2, are set. A start of main injection at approximately 7°CAaTDC is preferred.

Furthermore, an accumulated or post-injection which also burns is carried out. This is to be understood as a post-injection with a start of post-injection immediately after, or only a few degrees CA after, the end of the main injection. The post-injected quantity of fuel is therefore detected by the combustion of the main injection.

If the combustion has an effect on torque, the quantity of fuel which is injected during the main injection is adapted in such a way that the torque which is output remains as far as possible unchanged and therefore fluctuations in torque due to a change into the fourth combustion method are avoided. The quantity of post-injected fuel is preferably of the order of magnitude of the quantity of fuel in the main injection here. In addition, in the first heating combustion method BV1 an injection pressure which is reduced compared to the basic combustion method BV2 is preferably set. An injection pressure reduction by approximately 30% to 50% is preferred. The EGR rate is preferably given a similar setting to that in the fourth combustion method BV4. In this context, an uncooled exhaust gas recirculation can be provided directly after the beginning of the cold start, and switching over to a cooled exhaust gas recirculation can take place after a predefinable exhaust gas temperature has been reached upstream of the oxidation catalytic converter 23.

If the oxidation catalytic converter 23 has reached its light-off temperature, a separate, late post-injection of fuel is activated in addition to the settings of the first heating combustion method BV1, in a way which is analogous to the fourth combustion method BV4. The activation of the post-injection typically occurs if the temperature at the inlet of the oxidation catalytic converter 23 or at the inlet of the particle filter 24 exceeds approximately 180° C., which is detected by reading in the measured values supplied from the temperature sensors 28, 29.

The application of heat into the exhaust gas is increased once more through post-oxidation of the unburnt fuel components which are added to the exhaust gas with the post-injection. As a result, components which are arranged downstream of the oxidation catalytic converter 23 reach their operating temperature quickly. In this case, a changeover to the basic combustion method BV2 is performed, typically when the temperature upstream of the SCR catalytic converter 25 or in the bed of said catalytic converter exceeds approximately 220° C.

In order to achieve a further increased heating effect in the first and/or second heating combustion methods, at least temporary heating of glow plugs which are assigned to the combustion chambers of the internal combustion engine can be provided. This measure is advantageous in particular when the engine is comparatively cold, and such measure is preferably taken if the temperature of the coolant used for cooling the internal combustion engine drops below a predefinable value of, for example, 50° C.

However, heating of the glow plugs can be provided even given corresponding travel conditions when the internal combustion engine is warmed up. For example, in addition to said settings in the basic combustion method BV2 and/or in the third combustion method BV3 and/or in the fourth combustion method BV4, it is possible to provide what is referred to as intermediate heating with heated glow plugs if travel conditions are present in which the internal combustion engine is becoming cooler or threatens to become cooler. This can be the case, for example, at a low partial load, in particular in conjunction with low external temperatures.

Figure 4:
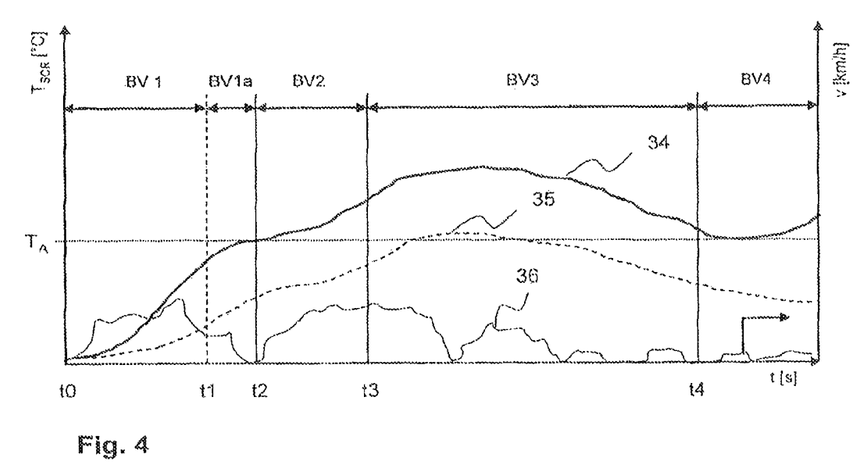
FIG. 4 is a timing diagram with exemplary temperature profiles for various operating settings together with an associated travel curve.

FIG. 4 illustrates, in diagram form, a temperature profile which is achieved in the exhaust gas post-treatment system A with the method according to the invention compared to a temperature profile for the continuously set basic combustion method BV2, together with an associated travel curve. Here, the travel curve which is denoted by 36 gives the velocity v of a motor vehicle which is equipped with the internal combustion engine 1 and the exhaust gas post-treatment system A according to FIGS. 1 and 2. The line 34 represents the temperature profile for the procedure according to the invention with setting of the different combustion methods BV1, BV1a, BV2, BV3 and BV4 according to the time segments at which the respectively specified combustion method is active. (The time segments are designated correspondingly at the upper edge of the diagram.) For comparison, the broken line 35 represents a temperature profile such as occurs with the continuously set basic combustion method BV2. Here, the lines 34, 35 represent an exhaust gas temperature TSCR which is respectively sensed with the temperature sensor 30 at the inlet end of the SCR catalytic converter 25.

According to the profile of the line 34, the temperature TSCR upstream of the SCR catalytic converter 25 rises quickly with a short delay starting from a cold start (t0) when the first heating combustion method BV1 is set. The rise in temperature continues after the changeover into the combustion method BV1a at the time t1 even though the velocity v is simultaneously decreasing. For this reason, the light-off temperature TA of the SCR catalytic converter 25 is reached at a comparatively early time t2, and urea solution can be metered into the exhaust gas. Therefore, both a changeover to the basic combustion method BV2, which is favorable for consumption, and reduction of nitrogen oxide can already take place at a comparatively early time. When the basic combustion method BV2 is active, the temperature TSCR continues to rise at moderate velocities v. It is therefore possible to change over relatively quickly to the combustion method BV3 which is optimized for consumption after a cold start has taken place at the time t3. At the low velocities v which occur in the time period between t3 and t4, only a small amount of heat is applied into the exhaust gas, so that the temperature TSCR drops. However, the temperature of the SCR catalytic converter 25 is prevented from dropping below its light-off temperature TA by virtue of the fact that a changeover to the combustion method BV4 with a heating effect occurs at the time t4. In this context, although the velocity v remains low, the temperature of the SCR catalytic converter 25 increases, so that it returns to the range of its optimum effectiveness.

In contrast, when the basic combustion method BV2 which is set constantly it is not possible to achieve satisfactory heating of the SCR catalytic converter 25, as is shown by a comparison with the temperature profile of the line 35. The temperature of the SCR catalytic converter 25 exceeds the light-off temperature $T_A$ for only a short time, so that no effective reduction in nitrogen oxide can be achieved. In contrast, the procedure according to the invention permits both low consumption of fuel and low emissions of pollutants.

It is possible to provide for deactivation of the inlet duct to be performed in the partial load range in the warmed-up state as a further measure for improving the combustion profile. The adoption of this measure is preferably tied to the presence of a minimum temperature of, for example, 40° C. of the coolant. When the inlet duct deactivation is carried out, the cross section of, in each case, one inlet duct 4 of the cylinder Z is increasingly reduced by means of a flap as the internal combustion engine load decreases. The inlet duct deactivation is preferably activated in a load range below approximately 50% of the rated load. This measure increases the swirl of the combustion air flowing into the cylinder Z of the internal combustion engine 1 and therefore reduces the consumption of fuel and the raw emissions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an air-compressing fuel-injection internal combustion engine having an exhaust gas post-treatment system that includes a particle filter and a nitrogen oxide reduction catalytic converter, said method comprising:
    providing for a plurality of internal combustion engine operating settings with respective predefined values for predefined internal combustion engine operating parameters;
    when the internal combustion engine is warming up, setting a heating operating setting, wherein when the heating operating setting is active and a temperature in the exhaust gas post-treatment system exceeds a predefinable second threshold value, a separate fuel post-injection is activated;
    when the temperature in the exhaust gas post-treatment system exceeds a predefinable first threshold value and the internal combustion engine is in a warmed-up state, changing from the heating operating setting to a basic operating setting and enabling addition of a reducing agent into the exhaust gas post-treatment system downstream of the particle filter and upstream of the nitrogen oxide reduction catalytic converter;
    wherein in the basic operating setting an exhaust gas recirculation rate is set that is higher compared to the heating operating setting;
    wherein in the basic operating setting a start of a main injection of fuel into cylinders of the internal combustion engine is set earlier compared to the heating operating setting; and
    wherein the internal combustion engine is operated with a compression ratio of less than 19:1 in the basic operating setting and in the heating operating setting.

2. The method as claimed in claim 1, wherein the first threshold value is a temperature value at which the nitrogen oxide reduction catalytic converter becomes effective.

3. The method as claimed in claim 1, wherein the first threshold value is higher than the second threshold value.

4. The method as claimed in claim 1, wherein the second threshold value is a temperature value at which an oxidation catalytic converter connected upstream of the particle filter becomes effective.

5. The method as claimed in claim 1, wherein in the basic operating setting the combustion of the internal combustion engine is configured to be optimized in terms of nitrogen oxide formation.

6. The method as claimed in claim 1, wherein the reducing agent is ammonia or urea.

7. The method as claimed in claim 1, wherein in the heating operating setting an uncooled exhaust gas recirculation is performed directly after the beginning of a cold start of the internal combustion engine.

8. The method as claimed in claim 1, wherein, when the heating operating setting or the basic operating setting is active, the fuel injection comprises at least one separate pre-injection.

9. The method as claimed in claim 1, wherein, at least when the basic operating setting is active, double fuel pre-injection is performed.

10. The method as claimed in claim 1, wherein, when the heating operating setting is active, a fuel injection pressure that is reduced compared to the basic operating setting is set.

11. The method as claimed in claim 1, wherein:
    in the warmed-up state, a fourth operating setting is provided;
    in the fourth operating setting, at least one of a late fuel post-injection and a reduced exhaust gas recirculation rate is implemented.

12. The method as claimed in claim 1, wherein, in at least one of the operating settings for the warmed-up state, an at least temporary inlet duct deactivation is implemented.

13. The method as claimed in claim 1, wherein, in at least one of the operating settings for the warmed-up state, a glow plug assigned to a combustion chamber of the internal combustion engine is heated, at least temporarily.

14. The method as claimed in claim 1, wherein the internal combustion engine is operated with a compression ratio of less than 17:1 in the basic operating setting and in the heating operating setting.

15. The method as claimed in claim 1, wherein in the basic operating setting a cooled exhaust gas recirculation is performed.

16. The method as claimed in claim 15, wherein in the heating operating setting an uncooled exhaust gas recirculation is performed directly after the beginning of a cold start of the internal combustion engine.

17. The method as claimed in claim 1, wherein when the internal combustion engine is in the warmed-up state, at least a third operating setting is set in addition to the basic operating setting.

18. The method as claimed in claim 17, wherein in the third operating setting an exhaust gas recirculation rate is set that is reduced compared to the basic operating setting.

19. The method as claimed in claim 17, wherein the third operating setting is configured to be optimized in terms of fuel consumption.

20. The method as claimed in claim 17, wherein in the third operating setting a start of a fuel main injection is set earlier compared to the basic operating setting.

21. The method as claimed in claim 17, wherein, when said third operating setting is active, a fuel injection pressure is set that is increased compared to the basic operating setting.

22. A method for operating an air-compressing fuel-injection internal combustion engine having an exhaust gas post-treatment system that includes a particle filter and a nitrogen oxide reduction catalytic converter, said method comprising:
- providing for a plurality of internal combustion engine operating settings with respective predefined values for predefined internal combustion engine operating parameters;
- when the internal combustion engine is warming up, setting a heating operating setting;
- when a temperature in the exhaust gas post-treatment system exceeds a predefinable first threshold value and the internal combustion engine is in a warmed-up state, changing from the heating operating setting to a basic operating setting and enabling addition of a reducing agent into the exhaust gas post-treatment system downstream of the particle filter and upstream of the nitrogen oxide reduction catalytic converter;
- wherein in the basic operating setting an exhaust gas recirculation rate is set that is higher compared to the heating operating setting;
- wherein in the basic operating setting a start of a main injection of fuel into cylinders of the internal combustion engine is set earlier compared to the heating operating setting;
- wherein the internal combustion engine is operated with a compression ratio of less than 19:1 in the basic operating setting and in the heating operating setting;
- wherein in the basic operating setting a cooled exhaust gas recirculation is performed;
- wherein in the heating operating setting an uncooled exhaust gas recirculation is performed directly after the beginning of a cold start of the internal combustion engine; and
- wherein a switching over from an engine operation with an uncooled exhaust gas recirculation to an engine operation with a cooled exhaust gas operation takes place after a predefinable exhaust gas temperature has been reached upstream of an oxidation catalytic converter that is arranged upstream of the particle filter.

23. The method as claimed in claim 22, wherein the first threshold value is a temperature value at which the nitrogen oxide reduction catalytic converter becomes effective.

* * * * *